United States Patent [19]

Savant et al.

[11] Patent Number: 5,276,537
[45] Date of Patent: Jan. 4, 1994

[54] DIAMONDLIKE CARBON THIN FILM PROTECTED HOLOGRAM AND METHOD OF MAKING SAME

[75] Inventors: Gajendra D. Savant, Torrance; Christopher C. Rich, San Pedro; David G. Pelka, Los Angeles, all of Calif.

[73] Assignee: Physical Optics Corporation, Torrance, Calif.

[21] Appl. No.: 828,353

[22] Filed: Jan. 30, 1992

[51] Int. Cl.$^5$ .............. G03H 1/02; G03H 1/04; B32B 9/00; B32B 31/00
[52] U.S. Cl. .............. 359/3; 359/1; 359/507; 428/408; 427/577; 430/1
[58] Field of Search .............. 428/408; 427/160, 577; 359/1, 3, 2, 15, 507, 512, 513, 22, 27, 28, 32; 430/1, 2

[56] References Cited

U.S. PATENT DOCUMENTS

| | | | |
|---|---|---|---|
| 4,329,409 | 5/1982 | Wreede et al. | 359/3 X |
| 4,330,604 | 5/1982 | Wreede et al. | 430/2 |
| 4,698,256 | 10/1987 | Giglia et al. | 428/480 |
| 5,082,359 | 1/1992 | Kirkpatrick | 359/642 |
| 5,135,808 | 8/1992 | Kimock et al. | 428/426 X |

Primary Examiner—Martin Lerner
Assistant Examiner—David R. Parsons
Attorney, Agent, or Firm—Nilles & Nilles

[57] ABSTRACT

A diamondlike carbon thin film protected hologram comprises an organic film deposited on a substrate and recorded to form a hologram, and a diamondlike carbon thin film deposited on the hologram, or first and second substrates having a diamondlike carbon thin film deposited thereon and an organic film having a holographic pattern recorded therein and sandwiched between the diamondlike carbon thin films of the first and second substrates. A method of fabricating a diamondlike carbon thin film protected hologram comprises forming a layer of dichromated gelatin on a substrate, recording the dichromated gelatin to form a hologram, and depositing on the hologram a diamondlike carbon thin film at room temperature, or depositing a diamondlike carbon thin film on first and second substrates, forming a layer of dichromated gelatin on the thin film of one of the substrates, recording the layer to form a hologram, and adhering the thin film of the second substrate to the hologram. The diamondlike carbon thin film protected hologram of the present invention is impervious to moisture and humidity and other environmental conditions which would otherwise negatively affect the performance of the hologram.

14 Claims, 2 Drawing Sheets

DIAMONDLIKE CARBON THIN FILM PROTECTED HOLOGRAM AND METHOD OF MAKING SAME

BACKGROUND OF THE INVENTION

1. Field of the Invention

This invention pertains to the protection of holograms made from dichromated gelatin. More particularly, this invention pertains to a diamondlike carbon thin film applied as a protective layer to dichromated gelatin holograms.

1. Background of the Prior Art

It has been demonstrated that dichromated gelatin (DCG) is a unique holographic recording material that can simultaneously demonstrate high reflectivity (greater than 99.5%) and broad bandwidth from near UV to near IR of the electromagnetic spectrum (0.3 $\mu$m to 2.8 $\mu$m). These properties are fully spelled out in the following references incorporated herein by reference.

1. T. Jannson, I. Tengara, Y, Qiao and G. Savant, "Lippmann-Bragg Broadband Holographic Mirrors," J. Opt. Soc. Am. A/Vol. 8, No. 1, 201–211 (1991).

2. B. J. Chang, "Dichromated Gelatin Holograms and Their Applications", Optical Engineering, Vol. 19, No. 5, 642–648 (1980).

3. B. J. Chang and C. D. Leonard, "Dichromated Gelatin for the Fabrication of Holographic Optical Elements", Applied Optics Vol. 18, No. 4, 2407–2417 (1979).

4. G. Savant, T. Jannson and Y. Qiao, "Super-high Resolution Holographic Materials for UV and XUV Applications," in Practical Holography, III, S. A. Benton, Ed. Proceedings Soc. Photo-Opt. Instrum. Eng. 1051, 148–155 (1989).

5. J. Jannson, T. Jannson, and K. H. Uy, "Solar Control Tunable Lippmann Holowindows," Solar Energy Materials 14, 289–297 (1986).

Among the many holographic recording materials that are currently available, DCG is the best irreversible material due to its excellent transparency, high diffraction efficiency, high signal to noise ratio, cost effectiveness, and availability of dichromated gelatin in almost grainless form, and its high spatial resolution with a uniform MTF between 100 and 5000 lines per mm. DCGs's dynamic range is very large, and its index modulation can reach as high as 0.2–0.50. Salminen, and T. Keinonen, "On Absorption Refractive Index Modulation of Dichromated Gelatin Gratings," Opt. Act. 29, 531–40 (1982). As a result of these unique properties, DCG holograms can be used in myriad applications including high channel density wavelength division multiplexing (U.S. Pat. No. 4,926,412), diffraction coherence filters (U.S. Pat. No. 4,958,892), broad band single mode couplers (U.S. Pat. No. 5,018,814), Lippmann holographic mirrors (U.S. Ser. No. 456,175, issued as U.S. Pat. No. 5,083,219), optical interconnects (U.S. Pat. No. 4,838,630), and numerous other important uses.

Such combination of properties is not displayed by currently available polymer-based holographic recording materials such as DuPont photopolymer, POLAROID DMP-128 recording material, Hughes' Polymer System, polyvinyl carbosols, or polyvinyl alcohol-based holographic recording systems. The composition of DuPont photopolymer is known and identified as "DuPont photopolymer" by those skilled in the art, and consists of a binder, initiator, monomer, sensitizer, and plasticizer as fully described in Smothers et al., "Photopolymers for Holography" and Weber et al., "Hologram Recording in DuPont's New Photopolymer Materials," Practical Holography IV, SPIE OE/Lase Conference Proceedings, 1212-03 and 04, Los Angeles, Calif., Jan. 14–19, 1990. The composition DMP 128 is also known and identified as DMP 128 by those skilled in the art, and consists of a dye sensitizer, a branched polyethylenimine as a polymerization initiator and a free radical polymerizable ethylenic unsaturated monomer as described in U.S. Pat. No. 4,588,664 and Ingwall et al., "Properties of Reflection Holograms Recorded in Polaroid's DMP-128 Photopolymer," SPIE Vol. 747 Practical Holography 11 (1987). Unlike synthetic polymer-based holographic recording materials, however, DCG is not immune to humidity and moisture in the atmosphere where DCG holograms are placed or stored. DCG holograms, in general, are affected by moisture or humidity of greater than 45% at room temperature. This problem is more severe when the temperature is higher than room temperature, say greater than 35° C. If both temperature and humidity are high, the rate of decay caused by moisture or humidity is quite high.

When a DCG hologram comes in contact with moisture, it loses its efficiency, i.e., its diffraction efficiency which is usually 99.5%, drops to as low as 90%, which makes it useless for certain applications like eye protection, Raman filters, etc. The problem lies in that the processed hologram has high and low crosslinked alternating planes of high and low refractive index (high material density and low material density) within the coating. When moisture is present at the coating, the high material density areas soften which lowers the refractive index of that area causing it to average out with the rest of the hologram. Because refractive index modulation decreases with high humidity and high temperature, thereby decreasing hologram efficiency, it is critical to protect DCG holograms from humidity and moisture.

Since the DCG holographic optical elements (HOE) fabrication process is labor-intensive and expensive, it is but natural to find ways to extend the life of DCG-HoEs. The useful life of HOEs has been extended by protecting them from moisture by either laminating or hermetically sealing them so that the DCG does not come in contact with moisture. The prior art discloses numerous ways to protect DCG holograms from the effects of humidity, each of which has its shortcomings.

1. Sealing the DCG hologram hermetically in a transparent box has been employed. This procedure is lacking because it interjects numerous interfaces which cause reflection and scattering. The transparent box is also bulky and inconvenient. Furthermore, it is necessary to remove all moisture from the interior of the box with a vacuum prior to sealing.

2. Liquid adhesive coatings have also been used to protect DCG holograms. These coatings generally comprise solvents and polymers. Many times, the solvents adversely affect the hologram, creating haziness on its surface. Furthermore, heat is necessary to cure the adhesive layer to eliminate the solvent. This additional step introduces inefficiencies into the system.

3. Epoxies have been used to protect holograms but suffer from the same problems as liquid adhesive coatings if they contain similar solvents. If the epoxy does not contain a solvent, epoxies nonetheless must be cured using either heat, UV, or room temperature for prolonged periods. High temperatures can shift the characteristics of the hologram, such as shifting the notch to a different set of wavelengths in a notch filter, even during low temperature curing. Whether high temperature-short duration or low temperature-long duration curing is used, the process is not efficient for commercial production.

UV curing is preferred especially if epoxies such as NORLAND No. 61, 67-69 adhesive, are used. UV, however, also has a tendency to shift the wavelength characteristics of the hologram. Furthermore, UV curing is likely to cause uneven curing of the hologram due to greater absorption of the UV wave by the upper layers of the hologram which are closer to the UV source. Additionally, small quantities of toxic gases are released creating bubbles and path marks in the adhesive. As a result the process is unacceptable and is generally not preferred for mass production.

Room temperature curing eliminates some of the problems of heat or UV curing but requires extremely lengthy curing times making this type of cure unacceptable for cost effective commercial production as well.

4. Finally, lamination using glass, a flexible film such as MYLAR film, or a fluoropolymer has been employed. Typically, to laminate any of these materials to the hologram, an adhesive, such as those discussed above, are necessary to secure the laminate to the hologram. The laminate retards evaporation of the solvents. Also, during lamination, moisture can get trapped between the adhesive and the hologram or the adhesive and the laminate. Typically, glass laminates are undesirable because they are too heavy, too brittle, and not impact proof. MYLAR film is typically unacceptable because it is not 100% waterproof. Fluoropolymers are difficult to use and suffer from a high failure rate if not processed optimally.

Each of the above-means of protecting a DCG hologram almost meets the specific conditions required to protect DCG but fails in some regard. State of the art teaching dictates that the primary condition that must be met to successfully protect DCG is to use a material that is waterproof and bonds well with DCG. Typically, the prior art has attempted to meet this condition and employed mostly hydrophobic adhesives or epoxies as discussed above. However, although epoxies and adhesives bond well with the DCG, they ultimately fail because of their weak interbond strength of the polymer epoxy chains. Due to the presence of these problems for many years, there has been a failure to protect DCG with a protective layer that is impervious to moisture and humidity but that bonds well with DCG. Consequently, high efficiency DCG holograms that are complex and costly to make, as well as more conventional DCG holograms, have been slowly losing their effectiveness. A protective layer for holograms that has excellent bonding, is scratch and impact proof, and fully waterproof would be of great benefit.

SUMMARY OF THE INVENTION

A diamondlike carbon (DLC) thin film protected DCG hologram and a method for making a DLC thin film protected DCG hologram is presented. Specifically, a DLC layer is deposited on a DCG hologram at room temperature using either a single or dual ion beam direct deposition method. DLC thin film is a known extremely hard material, an excellent insulator, has extreme corrosion resistance, provides extremely high heat dissipation and high temperature resistance, is impervious to moisture and as smooth as but more durable than TEFLON coating, and is chemically inert. The DLC thin film protected DCG hologram is thus impervious to moisture and humidity and results in a DCG hologram in a class by itself. The room temperature process by which diamondlike carbon thin film is deposited on the DCG hologram does not adversely affect the hologram, will not cause shifting of the hologram's wavelength characteristics, and creates a coating which is transparent from near-UV through IR.

A process for fabricating a DCG hologram is also disclosed which comprises the steps of forming a layer of dichromated gelatin, recording the dichromated gelatin to form a hologram, and depositing on the hologram a DLC thin film by a room temperature deposition process. Additional processes for fabricating a protected DCG hologram comprise pouring a viscous solution of dichromated gelatin on a substrate, spinning the substrate to form a uniform thin film of dichromated gelatin, drying the thin film, exposing the thin film to a monochromatic light source to record a desired pattern in the thin film, processing the exposed thin film by dipping in fixer solution and a series of water, water and alcohol, and alcohol baths, drying the processed thin film, and forming a protective layer on the dried thin film, the protective layer comprising a room temperature deposition of DLC thin film.

DESCRIPTION OF THE PREFERRED EMBODIMENTS

The diamondlike carbon (DLC) thin film protected holograms of the present invention may be made utilizing conventional hologram fabrication and DLC thin film production techniques. The well known process of making holograms need not be discussed here except to state that the process of creating a DCG volume hologram generally includes the steps of preparing a dichromated gelatin film, coating a substrate with the film using either spin coating, web coating, casting, doctor's blade, or dip coating processes, each of which should create a uniform thin film of dichromated gelatin on the substrate. The thin film is then dried, and exposed to the desired light source or light sources to record the desired pattern. As is appreciated in the art, virtually innumerable patterns or holographic fringes may be recorded in the thin film depending upon the end use of the hologram. After exposure, the recorded thin film is then processed using fixer solution and a series of water, water and alcohol, and alcohol baths. The type and extent of processing determines the additional characteristics imparted to the hologram. An excellent source regarding holography is Collier, "Optical Holography", Academic Press (1971) incorporated herein by reference. The preparation, exposure and processing of DCG films is discussed specifically at pages 293-298 of that reference. Other helpful references are those cited in the background section above which likewise are incorporated herein by reference. After processing, a DLC thin film is deposited on the hologram.

Figure 1:
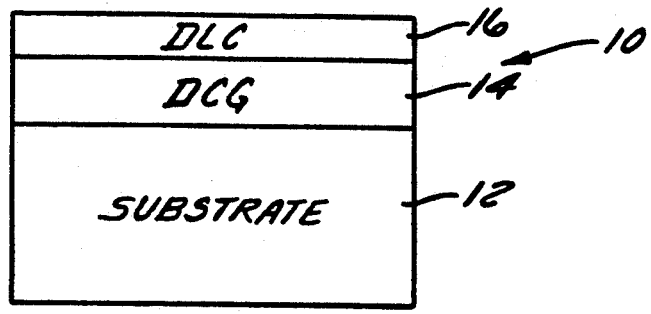
FIG. 1 is a schematic of a diamondlike carbon thin film protected hologram of the present invention.

The DLC thin film may be produced using the process disclosed in U.S. Pat. No. 4,490,229 and described in M. Mirtich, et al. "Dual Ion Beam Processed Diamondlike Films for Industrial Application", preprint for Technology 2000, Nov. 27-28, 1990, Washington, D.C. (NASA) incorporated herein by reference. Other various and known dual beam or single beam ion deposition processes for depositing DLC films may also be used to coat the DCG hologram. A DCG protected hologram 10 comprising a substrate 12, such as glass, polycarbonate, or others, DCG hologram 14, and DLC coating 16 is shown in FIG. 1.

In the ion beam process generally, a mixture of hydrocarbons and argon is supplied to an ion source where a plasma is produced. Electrically charged grids placed at one end of the ion source extract the ions and accelerate them toward the substrate to be coated. The coated surface is maintained at or near room temperature since it is remote from the energetic plasma within the ion source. Carbon and hydrocarbon ions combine on the substrate surface to produce a dense, hard form of carbon, resulting in a material with chemical and physical properties similar to diamond but without long range crystalline order. The ion beam process can be controlled to produce dense films with excellent substrate adhesion and high optical transparency.

Because the DLC thin film is applied to the hologram after the hologram is recorded and processed, the DLC thin film may be applied to the hologram at a site distant from the site of manufacture of the hologram. Of course, the processed hologram may be exposed to moisture and humidity in the interim which will begin the decay process. It would be beneficial to coat the completed hologram with the DLC thin film as soon as is practicable after processing the hologram.

The thickness of the DLC thin film applied to the hologram is dependent upon the ultimate use of the hologram and the harshness of its ultimate environment. The ion beam deposition process may achieve film thicknesses as great as 1.5 $\mu$m or more. Spectral transmittance analysis of DLC films generated using the single and dual beam ion source system, show that a 1500 Å thick dual beam film has greater transmittance at all wavelengths when compared to a 1500 Å thick single beam film. Some thinner DLC films (800 to 1500 Å thick) look clear to yellow-like in appearance and films thicker than 1500 Å usually look brown. The transmittance of a 500 Å thick film was found to be greater than 90% at wavelengths greater than 7000 Å. Of course, in the usual case a DLC coating for a DCG hologram should have as high a transmittance as possible, but the exact degree of transmittance may be different for different applications. The infrared transmittance of DLC films has been shown to be 100% transmitting in the wavelength region between 2.5 and 20 $\mu$m.

The chemical and physical properties of DLC films make them an excellent, although unexpected, protective coating for DCG holograms. DLC films are, by their nature, hydrophobic, and therefore it was unexpected that there would be sufficient bonding between the DLC film and the DCG hologram. Despite its hydrophobic nature, the DLC film bonds strongly with the DCG hologram. Due to its hydrophobic nature, the DLC film makes the DCG hologram waterproof.

Figure 2:
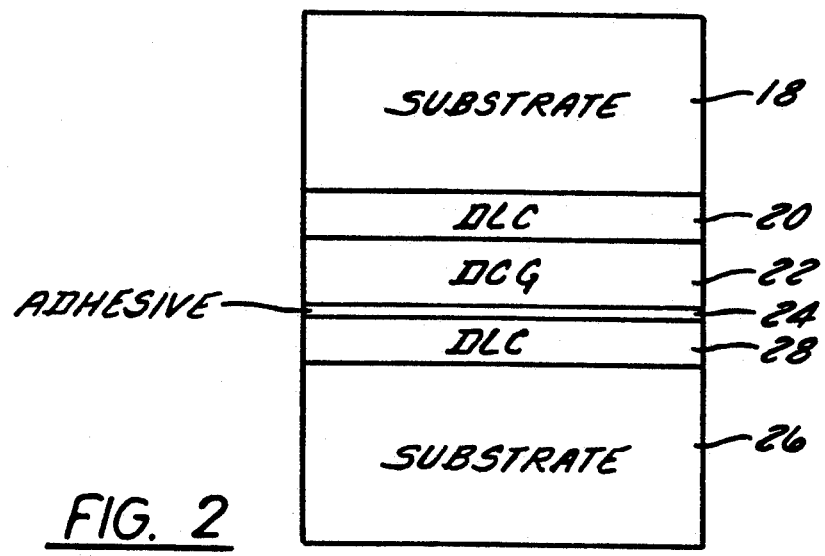
FIG. 2 is a schematic of a diamondlike carbon thin film protected hologram of the present invention employing a polycarbonate substrate.

Particularly in the case of polycarbonate substrate-based holograms, various combinations of DLC coated polycarbonate substrates and methods of forming such combinations may be employed. Polycarbonate substrates, unlike glass substrates, do not provide the necessary protection from humidity or moisture. One embodiment, shown in FIG. 2, comprises polycarbonate substrate 18, DLC layer 20, DCG hologram 22, adhesive 24, polycarbonate substrate 26 and DLC layer 28. To fabricate this protected hologram, polycarbonate substrate 18 is coated with DLC layer 20, which is then coated with DCG layer 22. DCG layer 22 is then recorded to form a hologram. Polycarbonate substrate 26 is then coated with DLC layer 28 and that layer (with the substrate 26) is then adhered to DCG layer 22 with adhesive 24 which may be NORLAND 61 adhesive or another suitable adhesive. The DCG layer 22 is thus thoroughly encapsulated between the polycarbonate/DLC layers 18, 20 and 26, 28.

Figure 3:
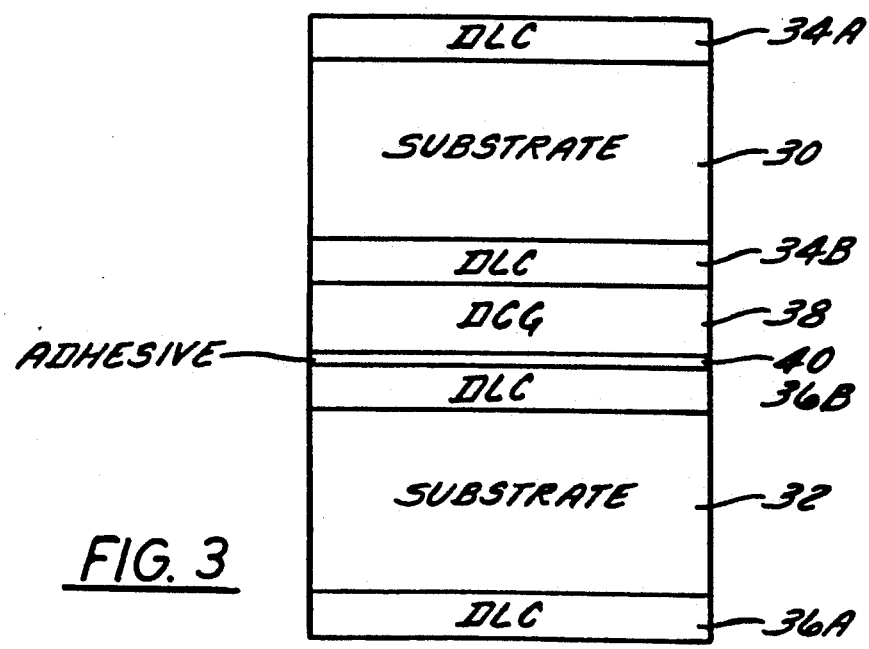
FIG. 3 is a schematic of a diamondlike carbon thin film protected hologram of the present invention employing a polycarbonate substrate.

A similar embodiment, shown in FIG. 3, comprises polycarbonate substrates 30 and 32, DLC layers 34A, 34B and 36A, 36B, DCG layer 38, and adhesive 40. To fabricate this protected hologram, polycarbonate substrates 30 and 32 are coated on both sides thereof with DLC layers 34A, 34B and 36A, 36B respectively. A DCG layer 38 is then coated on DLC layer 34B and is then recorded to form a hologram. DLC layer 36B of polycarbonate 32 is then affixed to DCG layer 38 with adhesive 40. The DCG layer 38 is thus thoroughly encapsulated between DLC coated polycarbonate layers 30 and 32.

Figure 4:
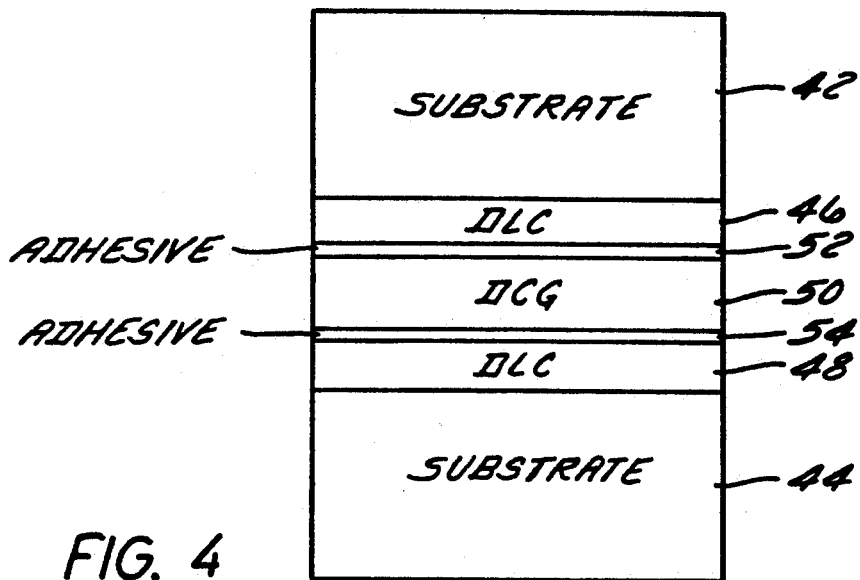
FIG. 4 is a schematic of a diamondlike carbon thin film protected hologram of the present invention employing a polycarbonate substrate and a DCG hologram produced by free-standing holographic techniques.

Referring to FIG. 4, a DLC thin film protected hologram fabricated using releasable hologram film techniques is disclosed. This embodiment comprises substrates 42 and 44, DLC layers 46 and 48, DCG layer 50, and adhesives 52 and 54. To fabricate this protected hologram, polycarbonate substrates 42 and 44 are each coated on one side with a DLC layer 46 and a DLC layer 48 respectively. A free-standing DCG layer 50 is then fabricated, recorded, and sandwiched between DLC layer 46 and DLC layer 48 on polycarbonate substrates 42 and 44 respectively with adhesive layers 52 and 54 respectively. The free-standing recorded DCG layer 50 may be made according to standard releasable UV cure techniques known in the art.

Figure 5:
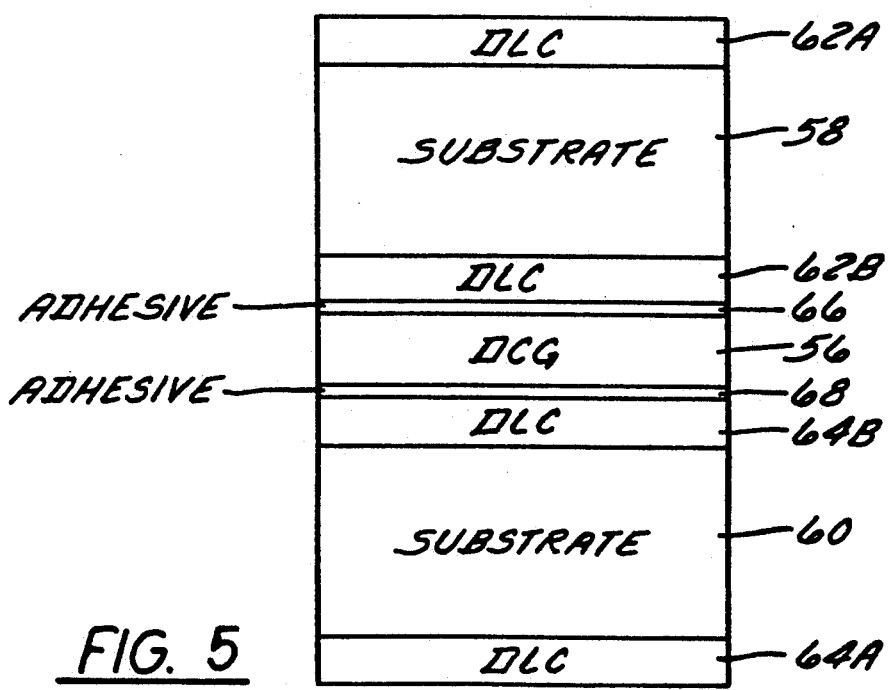
FIG. 5 is a schematic of a diamondlike carbon thin film protected hologram of the present invention employing a polycarbonate substrate and a DCG hologram produced by free-standing holographic techniques.

A similar embodiment, shown in FIG. 5, comprises DCG layer 56 made using releasable hologram film techniques, polycarbonate substrates 58 and 60, DLC layers 62A, 62B and 64A, 64B and adhesives 66 and 68. To fabricate this protected hologram, the free-standing releasable UV cure hologram 56 is sandwiched between polycarbonate substrates 58 and 60 which are coated on both sides with DLC layers 62A, 62B and 64A and 64B, respectively and using adhesive 66 between DLC layer 62B and DCG hologram 56 and an adhesive 68 between DLC layer 64B and DCG hologram 56. Each of the above embodiments provides an encapsulated DCG hologram impervious to moisture and humidity.

DLC films can be deposited on virtually any type of hologram in any shape or form including DCG, DuPont photopolymer, POLAROID DMP-128 recording material, silver halide, or photoresist. DLC films cannot only be used to coat flat substrates but can be used to coat curved holograms, HOEs, laser protection eyeware (goggles and visors), periscopes and innumerable other hologram forms.

The resistance of laser protection eyeware to scratches and damage is greatly enhanced by DLC film. Current laser eye protection strategies employed by the U.S. Army for its wide range of ocular protection devices use multiple holographic or dielectric coatings to protect against known threats and yet yield high photopic and scotopic efficiency. As the number of threatening wavelengths increases, the corresponding cost of laser protection eyeware increases. Greater attention must in turn be focused on how to prolong the useful lifetime of laser eyeware devices. In a typical operating environment, the laser protection eyeware worn by Army foot soldiers is exposed to moisture, oil, fuels, and other materials that damage the eyeware. The DLC protected DCG hologram of the present invention is so highly chemically resistant and scratch resistant that laser protection eyeware coated with DLC films may be virtually undamageable in such harsh environments.

It is to be understood that embodiments of the present invention not disclosed herein are intended to be within the scope of the claims.

We claim:

1. A process for fabricating a dichromated gelatin hologram comprising the steps of:
    forming a layer of dichromated gelatin on a substrate;
    recording the dichromated gelatin to form a hologram;
    depositing on the hologram a diamondlike carbon thin film at room temperature.

2. The process as defined in claim 1 wherein the substrate is flat.

3. The process as defined in claim 1 wherein the substrate is curved.

4. A process for fabricating a hologram comprising the steps of:
    pouring a viscous solution of dichromated gelatin on a substrate;
    spinning the substrate to form a uniform film of dichromated gelatin;
    drying the film;
    exposing the film to a monochromatic light source to record a desired pattern in the film;
    processing the exposed thin film by dipping in fixer solution and a series of water, water and alcohol, and alcohol baths;
    drying the processed film; and
    forming a protective layer on the dried film, the protective layer comprising a room temperature deposition of diamondlike carbon thin film.

5. A protected hologram comprising:
    a substrate;
    an organic film deposited on the substrate, the film having a holographic pattern recorded therein; and
    a diamondlike carbon thin film deposited on the film.

6. The hologram as defined in claim 5 wherein the film is selected from the group consisting of dichromated gelatin, photoresist, silver halide, POLAROID DMP-128 recording material, or DuPont photopolymar recording material.

7. A process for fabricating a dichromated gelatin hologram having first and second substrates, each substrate having two sides, the process comprising the steps of:
    depositing on one side of each of the first and second substrates a diamondlike carbon thin film;
    forming a layer of dichromated gelatin on the thin film of the first substrate;
    recording the layer to form a hologram;
    adhering the thin film of the second substrate to the hologram.

8. The process as defined in claim 7 further characterized by depositing a diamondlike carbon thin film on the other side of each of the first and second substrates.

9. The process as defined in claim 7 or 8 wherein the first and second substrates comprise polycarbonate.

10. A process for fabricating a dichromated gelatin hologram having first and second substrates, each substrate having two sides, the process comprising the steps of:
    depositing on one side of each of the first and second substrates a diamondlike carbon thin film;
    preparing a free-standing dichromated gelatin layer;
    recording the layer to form a hologram;
    sandwiching the hologram between the thin films on the one side of each of the first and second substrates.

11. The process as defined in claim 10 further characterized by depositing a diamondlike carbon thin film on the other side of each of the first and second substrates.

12. The process as defined in claim 10 or 11 wherein the first and second substrates comprise polycarbonate.

13. A protected hologram comprising:
    first and second substrates;
    a diamondlike carbon thin film deposited on each of the first and second substrates;
    an organic film having a holographic pattern recorded therein and sandwiched between the diamondlike carbon thin films of the first and second substrates.

14. The hologram as defined in claim 13 wherein the film is selected from the group consisting of dichromated gelatin, photoresist, silver halide, POLAROID DMP-128 recording material, or DuPont photopolymer recording material.

* * * * *